W. P. HAMMOND.
MEANS FOR REFLECTING AND OBSERVING TRAFFIC CONDITIONS FOR AUTOMOBILES.
APPLICATION FILED AUG. 2, 1913. RENEWED JAN. 16, 1919.

1,437,974.

Patented Dec. 5, 1922.

Witnesses:
Arthur Choquet
Harry B. Rook.

William P. Hammond
Inventor
By his Attorney J. H. Lee

Patented Dec. 5, 1922.

1,437,974

UNITED STATES PATENT OFFICE.

WILLIAM P. HAMMOND, OF NEW YORK, N. Y.

MEANS FOR REFLECTING AND OBSERVING TRAFFIC CONDITIONS FOR AUTOMOBILES.

Application filed August 2, 1913, Serial No. 782,699. Renewed January 16, 1919. Serial No. 271,509.

*To all whom it may concern:*

Be it known that I, WILLIAM P. HAMMOND, citizen of the United States, residing at New York, in the county of New York and State of New York, have invented certain new and useful Improvements in Means for Reflecting and Observing Traffic Conditions for Automobiles, of which the following is a specification.

This invention relates to mirrors for motor vehicles.

It is an object of this invention to provide a mirror which will reflect comprehensively a view of traffic conditions in the rear of the automobile within the operator's range of vision, this view being observable while sitting in usual driving position so that without turning the head, it is possible to instantly and practically simultaneously know the exact condition of both front and rear traffic conditions, and in this manner, the operator's vigilance regarding objects in the path of travel need not for an instant be relaxed greatly facilitating the avoidance of accidents.

My invention therefore comprehends the association of a mirror and windshield in such relation to each other as to present superposed zones of observation, the mirror occupying an upper substantially parallel plane with respect to the windshield, so that the operator's observation through the windshield of traffic conditions in the direction of travel and his observation of traffic conditions in the rear as reflected through the mirror may be accomplished substantially co-incidently.

The danger incident to the distraction of an operator's attention from the road in the direction of travel by ascertaining the rear traffic conditions by means heretofore in use is in direct proportion to the rate of speed of the moving vehicle. It is, therefore, of prime importance to facilitate and render easy the ascertainment of both rear and front traffic conditions so as to minimize the danger of accident to life and damage to property. It is this desideratum that my invention has in view and by means of which its accomplishment is attained.

In its broader aspect, my invention contemplates a mirror which will reflect not only objects directly in the rear of but also objects to the side and rear of the automobile, thus obviating the necessity of the driver turning his head to observe a passing car when it overtakes him and is passing from the rear. It is also the object of this invention to provide a device which will accomplish the previously-mentioned objects without protruding from the side of the vehicle, thus eliminating vibration which hinders observation and the danger of such protruding members being struck and knocked off, which will be in a most convenient position for the automobile operator's use without interfering with such operator's view, which will be readily adjustable independently of the windshield adjustment or of any automobile part and which will have no dependence upon the portion of such other parts for other than support.

Mirrors heretofore used on vehicles have either projected from the side of the vehicle with attendant liability of damage from passing objects and so exposed to dirt and dust that the rear vision obtained by their means may become clouded and obscured, or have been mounted upon the fender of the machine so far distant from the eyes of the operator that their usefulness for the desired purposes has been necessarily limited. These mirrors were of necessity so located with respect to the vehicle operator that in most cases he had to turn his head to observe even the limited views of the rear as these mirrors afforded, with the consequent dangers incident to diverting attention from the road being traveled. Furthermore, these mirrors were of limited range and therefore, adapted to reflect only a small portion of the rear, and this only at some distance because of the obstruction presented by the vehicle top and side supports and curtains. Therefore, it has been impossible in a great many instances for the operator to know of the presence of a following car immediately in the rear and would only learn of its presence when it turned out to pass, frequently too late to avoid collision with the forward vehicle when the latter changed its course as in turning corners, or in turning out to avoid vehicles parked at the curb or other obstructions. Such mirrors are rendered still further of lessened value when used in connection with closed cars owing to the obstructions afforded by the posts or stanchions of the car which support the roof and side sashes.

My present invention obviates these inherent objectional characteristics of past rear view mirrors. In carrying my invention into practice, I provide a mirror directly in or closely to the line of forward vision of the vehicle operator so that without removing the eyes for more than an instant from the direction of travel, one may secure a comprehensive knowledge of surrounding traffic conditions, and this without moving from position or relaxing control of the vehicle, or interfering in the slightest degree with the use of the adjustable windshield.

By the use of my invention, the driver may see all objects in the immediate rear of the automobile, or anywhere back of the line of direct vision, he is able to tell if he can safely stop, turn or back the automobile without accident. The importance of this when the automobile is being operated in crowded thoroughfares can be easily seen. as an instance, pedestrians are very apt to attempt to cross a street by passing close to the back of an automobile and are liable therefore to be struck if the automobile is backed at such time.

In carrying my invention into practice, I use a mirror of elongated shape preferably greater in length than height to provide superposed zones of observation and preferably, the mirror is adjustably mounted with respect to the windshield, so that the adjustment of the windshield or a section thereof for ventilation purposes may be accomplished without affecting the focal position of the mirror and vice versa; the mirror may be adjusted independently of the windshield so that a proper focus of the mirror may be had and maintained to permanently cover the area desired.

I will now proceed to describe the specific embodiments, I have chosen to illustrate in the accompanying drawing by way of example as certain methods of carrying my invention into practice and in which drawings.

Corresponding and like parts are referred to in the following description and indicated in all the views of the drawings by the same reference characters.

In carrying out the broad idea of the invention, a mirrored strip, such as a piece of silvered glass, is preferably mounted upon the frame of the wind shield or upon the adjacent edges thereof so as to give a reflected view of the road at the rear of the vehicle. This mirrored strip may extend the full length of the wind shield, and may be adjustably mounted so as to be set and clamped in the most advantageous position.

Figures 1, 2:
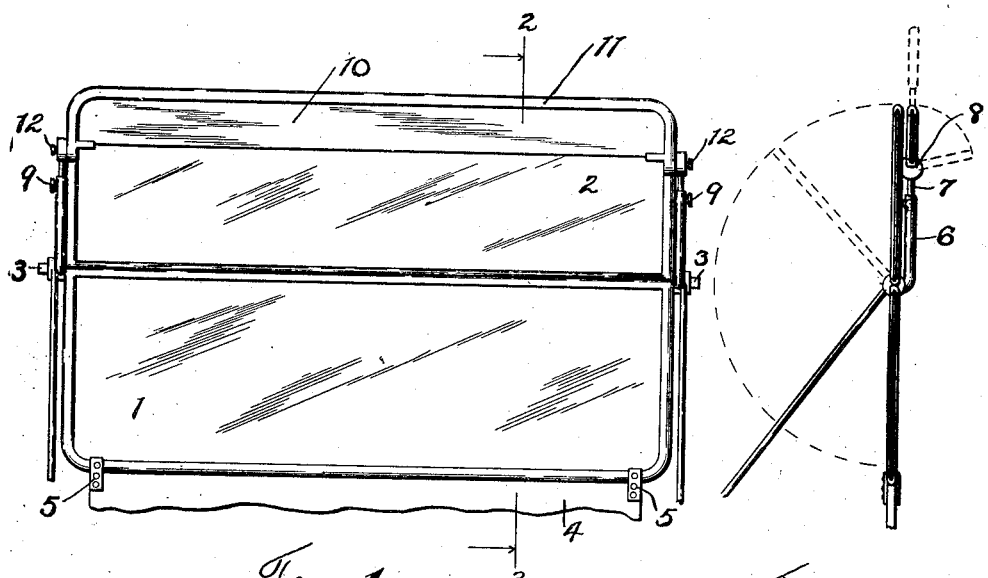
Figure 1 is a front elevation of one embodiment of my invention.
Figure 2 is a transverse sectional view on the line 2—2 of Figure 1 looking in the direction of the arrows.

One embodiment of my invention is shown by Figures 1 and 2, in which the mirrored strip is suitably mounted so as to be applied to a conventional form of wind shield as an attachment. The numeral 1 designates the lower wind shield section, and 2 the upper wind shield section, the two sections being pivotally connected by means of the central pivots 3 and being formed of some transparent material such as glass. This is a conventional form of wind shield, the lower section 1 thereof being rigidly fitted to the dashboard 4 by suitable clamps 5, while the upper section 2 thereof is adapted to be swung about the central pivots 3 and either folded downwardly against the lower section 1 or swung upwardly into substantial alinement therewith. A standard or upright arm 6 is applied to either side of the wind shield. In the present instance such standards or arms 6 are shown as secured to the central pivots 3 of the wind shield and as being offset from the vertical plane of the wind shield. A stem 7 is mounted upon each of the standards or arms 6 for vertical adjustment, the said stems terminating at their upper ends in the pivot heads 8. The standards or arms 6 may have a tubular formation and the stems 7 mounted therein to have a telescoping movement, suitable means such as a set screw 9 being provided for locking the stems in an adjusted position. The mirrored strip 10 is here shown as extending the full length of the wind shield and as mounted in a frame 11, the lower edge of the frame being pivotally mounted upon the pivot heads 8 of the stems 7 so as to have a swinging movement. Suitable means such as the set screws 12 may be provided for clamping the mirrored strip 10 in an adjusted position. Referring to Figure 2, it will be observed that the mirrored strip 10 is offset laterally from the plane of the wind shield and that it can be raised or lowered vertically or swung about the axis of its support into any desired position.

Figures 3, 4:
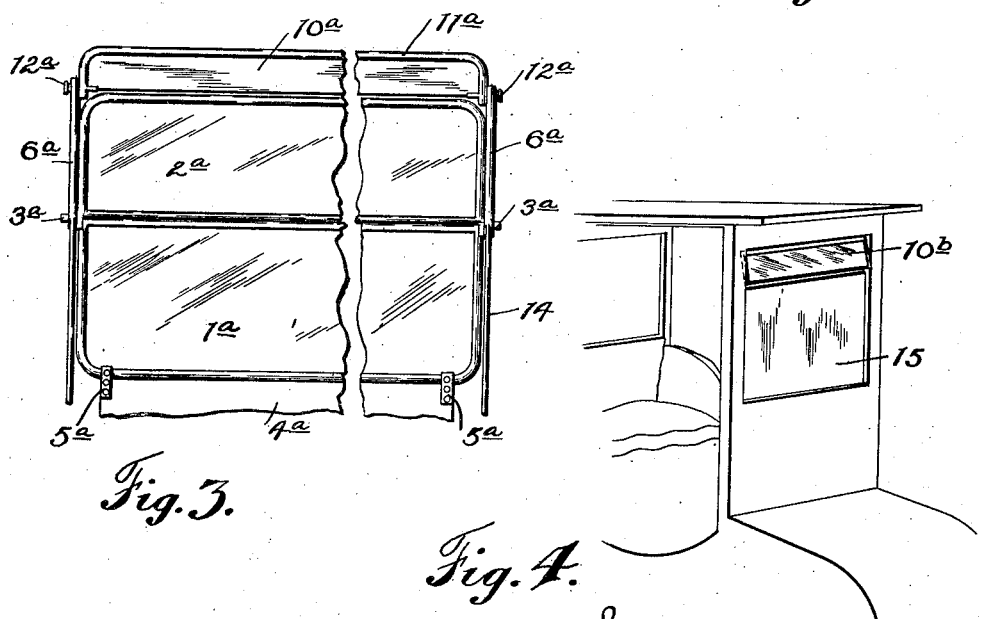
Figure 3 is a front elevation of a slightly modified form of the embodiment disclosed in Figure 1.
Figure 4 is a perspective view of the front of a coupe or like closed car, showing a still further modification of the invention.

A modification is shown by Figure 3, in which the mirrored strip is incorporated into a structure over the wind shield instead of being merely an attached portion for the conventional form of wind shield previously described. The numeral 1$^a$ designates the lower wind shield section, and 2$^a$ the upper wind shield section, the two sections being connected by the central pivots 3$^a$. The mirror strip 10$^a$ being mounted over the upper edge of the same. The lower wind shield section 1$^a$ is clamped to the dash board 4$^a$ in the usual manner by means of the clamps 5$^a$, and the upper section 2$^a$ is adapted to be swung about the central pivots 3ᵃ in the usual manner. A pair of standards 6ᵃ project upwardly past each end of the upper wind shield section 2ᵃ, extending slightly above the top thereof. These standards 6ᵃ may be rigidly mounted in position, and are shown in the present instance as integral with the diagonal braces 14 and as engaged by the central pivots 3ᵃ. The mirrored glass strip 10ᵃ is mounted in a frame 11ᵃ which is pivotally mounted between the upper end of the standards 6ᵃ so as to be tilted into any desired position. Suitable means such as the clamping screws 12ᵃ may be provided for locking the mirrored strip in an adjusted position. With this construction the mirrored strip is mounted over the upper edge of the wind shield sections and is arranged substantially in the plane of the wind shield, instead of being offset from the plane thereof, as in the previous instance. The upper wind shield section 2ᵃ can be either folded downwardly against the lower wind shield section 1ᵃ or swung upwardly without interfering in any manner with the mirrored strip, and this mirrored strip can in turn be adjusted in any desired manner without interfering with the wind shield.

A further modifiction is shown by Figure 4 which illustrates a coupe which is provided at the front thereof with a glass wind shield 15 and a mirrored strip 10ᵇ arranged at the top of the wind shield. This mirrored strip is pivotally mounted at opposite ends thereof so as to be tilted about a horizontal axis and swung into the most advantageous position. Provision may be thus made for ventilating the inside of the car, as well as providing the usual glass wind shield and an effective mirror in conjunction therewith.

It will thus be seen that my present invention offers many important advantages over previously used devices. It will also be evident that while I have chosen for illustrative purposes mirrors extending substantially the width of the automobile windshield. The mirror can obviously be of lesser length and still serve its intended purposes.

It will be evident that all of the above and many other changes may be made without departing from the spirit of my invention or the scope of the following claims. Where I have in the appended claims used the word "elongated" mirror, I mean any mirror which when in supported position has greater length than height. Where I have used the term "superposed," I mean among other positions to include positioning the mirror in front of or adjacent to the windshield, as shown in Figures 1 and 2, or above the windshield as shown in Figures 3 and 4, the mirror may also only partially overlie the windshield as is possible with the adjustable construction shown in Figure 2. Furthermore, the mirror may be angularly disposed with respect to the windshield structure in order to reflect the desired area or areas. Where I have used the term "zone," I mean to include any area within the width or height of the vehicle that may be occupied by a windshield or mirror to effect the means of desired observation, within which traffic conditions are established or made known; thus where I speak of the mirror and windshield serving to provide superposed zones of observation, it is intended to convey the idea that one zone is over, above or adjacent the other, thus enabling one to visualize traffic conditions forward and to the rear of the vehicle practically simultaneously, by merely shifting the eyes.

In connection with the foregoing statements, it is desired to emphasize the fact that the small attachable mirror scopes, as now quite commonly used, being attached to the side of the wind shield are mere makeshifts and very inadequate for their intended purpose, whereas with the present combined wind shield and mirror a full view of the road is obtained by a slight elevation of the eye, it being unnecessary to lean over to one side so as to get the old form of side mirror scope in focus.

Having thus described the invention, what I claim as new and desire to secure by Letters Patent, is:—

1. The combination with a wind shield including a swinging transparent section, of a mirror strip extending the full length of the wind shield, and end standards carrying the full length mirror strip and supporting the same adjacent the top of the transparent wind shield section, the latter giving a clear vision of the road in front, while the full length mirror strip reflects a full view of the road behind, the full length mirror strip being adjustable independently of the wind shield section.

2. The combination with a wind shield including a swinging transparent section, of a mirror strip extending the full length of the wind shield, and end standards upon which the full length mirror strip is mounted for vertical adjustment, being adapted to be positioned above the wind shield section for cooperation therewith to form a wind shield of increased height and to remain in operative position when the wind shield section is swung downwardly, the transparent wind shield section giving a clear vision of the road in front, while the full length mirror strip reflects a full view of the road behind.

3. The combination with a wind shield including a swinging transparent section, of a mirror strip extending the full length of the wind shield, end standards formed in telescoping sections and having the ends of the full length mirror strip pivoted thereon to admit of the mirror strip being tilted into different angular positions, said mirror strip being adapted to be positioned above the wind shield section for cooperation therewith to form a wind shield of increased height, and the transparent wind shield section giving a clear vision of the road in front, while the full length mirror strip reflects a full view of the road behind.

4. The combination with a wind shield including a swinging transparent section, a mirror strip extending the full length of the swinging wind shield section, and end standards offset laterally from the plane of the swinging wind shield section when in upright position, the full length mirror strip being mounted upon the end standards and supported thereby at the top of the wind shield section, the wind shield section being adjustable independently of the full length mirror strip and giving a clear vision of the road in front, while the mirror strip reflects a full view of the road behind.

5. The combination with a wind shield including a swinging transparent section, of a mirror strip extending the full length of the wind shield, end standards offset laterally from the plane of the wind shield section when in upright position, said end standards being formed in telescoping sections and having the ends of the full length mirror strip pivoted thereon so that the mirror strip can be tilted into different angular positions, the mirror strip being adapted to be positioned above the wind shield section for cooperation therewith to form a wind shield of increased height, the transparent wind shield section giving a clear vision of the road in front, while the mirror strip reflects a full view of the road behind.

6. The combination with a wind shield formed with a transparent portion, of a horizontally elongated mirror strip, and means for supporting the mirror strip upon the wind shield with the mirror strip and transparent portion of the wind shield extending across the line of vision in superposed horizontal zones, the mirror strip reflecting a view of the road behind while the transparent wind shield portion gives a clear view of the road in front.

7. The combination with a wind shield formed with a transparent portion, of a horizontally elongated mirror strip positioned adjacent the upper part of the transparent wind shield portion, the mirror strip and wind shield extending across the line of vision in superposed horizontal zones and the mirror strip reflecting a view of the road behind while the transparent wind shield portion gives a clear view of the road in front.

8. The combination with a wind shield formed with a transparent portion, of a horizontally elongated mirror strip positioned adjacent the upper part of the wind shield, and means for tiltably supporting the mirror strip so that it can be swung into different angular positions, the mirror strip and transparent portion of the wind shield extending across the line of vision in superposed horizontal zones and the mirror strip reflecting a view of the road behind while the transparent wind shield section gives a clear view of the road in front.

9. The combination with a wind shield including a swinging transparent portion of an elongated mirror strip positioned adjacent the upper part of the wind shield, and means for tiltably supporting the mirror strip, the mirror strip and wind shield portion being tiltable independently of each other and extending across the line of vision in superposed horizontal zones so that the mirror strip reflects a view of the road behind while the transparent wind shield portion gives a clear view of the road in front.

10. The combination with a transparent wind shield, of a mirror strip extending substantially the full length of the wind shield and normally positioned above the same to form a wind shield of increased height, said mirror strip being tiltable into different angular positions and reflecting a full view of the road behind, while the wind shield gives a clear view of the road in front.

11. The combination with a windshield including a swinging transparent section, of a mirror strip extending the full length of the windshield, and end standards carrying the full length mirror strip and supporting the same adjacent the top of the transparent windshield section, the latter giving a clear vision of the road in front, while the full length mirror strip reflects a full view of the road behind, the windshield section being adjustable independently of the full length mirror strip.

12. The combination with an automobile windshield, of a horizontally disposed, relatively long and narrow mirror positioned within the width of the windshield and above the normal line of vision of the driver, said mirror being positioned to reflect a full view of traffic conditions in rear of the automobile, whereby such traffic conditions may be observed by the driver substantially simultaneously with his observation of traffic conditions in front of the automobile.

13. The combination with an automobile body having a windshield including an adjustable part, of a mirror positioned within the width of said automobile body and above the normal line of vision of the driver, said mirror being so shaped and located as to provide a zone of observation positioned towards the opposite side of the car from the driver's seat to reflect traffic conditions immediately in rear of the automobile, said mirror being supported independently of said adjustable part, whereby said part may be adjusted without affecting the position of the mirror.

14. In combination with a transparent windshield, an elongated mirror forming therewith superposed horizontal zones, whereby the driver has substantially simultaneously a view through the mirror of the road behind and through the transparent windshield of the road in front.

In testimony whereof I affix my signature in presence of two witnesses.

WILLIAM P. HAMMOND.

Witnesses:
GEORGE EBERHARDT, Jr.,
P. FRANK SONNEK.